US012623283B2

US 12,623,283 B2

(12) United States Patent
Hibino et al.

(10) Patent No.: US 12,623,283 B2
(45) Date of Patent: May 12, 2026

(54) COMPOSITE SINTERED BODY, METHOD OF PRODUCING THE SAME, AND JOINING MATERIAL

(71) Applicant: KAWASAKI JUKOGYO KABUSHIKI KAISHA, Kobe (JP)

(72) Inventors: Shinya Hibino, Kobe (JP); Ryutaro Okada, Kobe (JP); Yoshimichi Nomura, Kobe (JP); Kazushige Fujimitsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 299 days.

(21) Appl. No.: 18/280,980

(22) PCT Filed: Mar. 7, 2022

(86) PCT No.: PCT/JP2022/009780
§ 371 (c)(1),
(2) Date: Sep. 8, 2023

(87) PCT Pub. No.: WO2022/191142
PCT Pub. Date: Sep. 15, 2022

(65) Prior Publication Data
US 2024/0149339 A1 May 9, 2024

(30) Foreign Application Priority Data

Mar. 12, 2021    (JP) ................................. 2021-040241

(51) Int. Cl.
*B23K 1/00*          (2006.01)
*B22F 3/10*          (2006.01)
(Continued)

(52) U.S. Cl.
CPC .................. *B22F 7/06* (2013.01); *B22F 3/10* (2013.01); *B22F 3/16* (2013.01); *B22F 3/225* (2013.01);
(Continued)

(58) Field of Classification Search
CPC ...... B22F 7/06; B22F 3/10; B22F 3/16; B22F 3/225; B22F 7/008; B22F 2301/15;
(Continued)

(56) References Cited

U.S. PATENT DOCUMENTS 4,280,841  A  *  7/1981  Ito .............................. B22F 7/06
                                                            419/14
9,839,980  B2    12/2017  Bruck
                                        (Continued)

FOREIGN PATENT DOCUMENTS

CN          110270689  A  *  9/2019  ................ B22F 7/06
CN          113857715  A  *  12/2021  ............. B23K 35/40
                                        (Continued)

OTHER PUBLICATIONS

May 17, 2022 International Search Report issued in International Patent Application No. PCT/JP2022/009780.

*Primary Examiner* — Kiley S Stoner
(74) *Attorney, Agent, or Firm* — Oliff PLC

(57)          ABSTRACT

A first pre-sintered body composed of a powder made of a first Ni-based alloy is prepared, and a second pre-sintered body composed of a powder made of a second Ni-based alloy is prepared. Subsequently, the first and second pre-sintered bodies are positioned to face each other across a predetermined gap, and a joining material made of a Ni-based alloy having a lower liquidus temperature than the first and second Ni-based alloys is placed in a space that adjoins the first and second pre-sintered bodies and to which the gap opens. After the placing of the joining material, the (Continued)

first and second pre-sintered bodies are heated to melt the joining material, fill the gap with the molten joining material, and subsequently turn the first and second pre-sintered bodies into first and second sintered bodies, respectively.

11 Claims, 3 Drawing Sheets

(51) Int. Cl.

| | |
|---|---|
| *B22F 3/16* | (2006.01) |
| *B22F 3/22* | (2006.01) |
| *B22F 7/00* | (2006.01) |
| *B22F 7/06* | (2006.01) |
| *B23K 1/19* | (2006.01) |
| *B23K 35/30* | (2006.01) |
| *B32B 15/01* | (2006.01) |
| *C22C 19/05* | (2006.01) |

(52) U.S. Cl.
CPC ............ *B22F 7/008* (2013.01); *B23K 1/0008* (2013.01); *B23K 1/19* (2013.01); *B23K 35/304* (2013.01); *B32B 15/01* (2013.01); *C22C 19/055* (2013.01); *B22F 2301/15* (2013.01); *B22F 2998/10* (2013.01); *B22F 2999/00* (2013.01)

(58) Field of Classification Search
CPC .. B22F 2998/10; B22F 2999/00; B22F 7/064; B23K 1/0008; B23K 1/19; B23K 35/3033–304; B23K 1/0018; B23K 2101/001; B32B 15/01; C22C 19/055; C22C 1/0433; C22C 19/056

USPC ................ 228/56.3, 245–262, 262.3–262.31
See application file for complete search history.

(56) References Cited

U.S. PATENT DOCUMENTS

| | | | | |
|---|---|---|---|---|
| 10,675,717 | B2 * | 6/2020 | Lechien | ............... B23K 35/306 |
| 2008/0017694 | A1 * | 1/2008 | Schnell | .................. B23K 35/30 |
| | | | | 228/262.9 |
| 2011/0076151 | A1 * | 3/2011 | Cui | ...................... B23K 1/0056 |
| | | | | 219/121.81 |
| 2015/0044059 | A1 * | 2/2015 | Wassynger | .............. F01D 5/147 |
| | | | | 29/889.1 |
| 2016/0339544 | A1 * | 11/2016 | Xu | ........................ B23K 35/304 |
| 2018/0326524 | A1 * | 11/2018 | Nicholas | .............. B23K 1/0016 |
| 2019/0043824 | A1 * | 2/2019 | Sugo | .......................... B22F 7/08 |
| 2019/0047081 | A1 * | 2/2019 | Kamakura | ................ B22F 7/08 |
| 2019/0051807 | A1 * | 2/2019 | Okumura | .............. H10N 10/01 |
| 2020/0180083 | A1 | 6/2020 | Richard | |
| 2024/0149339 | A1 * | 5/2024 | Hibino | ................. B23K 1/0008 |

FOREIGN PATENT DOCUMENTS

| | | | | | |
|---|---|---|---|---|---|
| EP | 0795377 | A1 * | 9/1997 | ............. | F01D 5/005 |
| FR | 2752540 | A1 * | 2/1998 | ............. | B22F 7/064 |
| JP | H09-225679 | A | 9/1997 | | |
| JP | 2004-285466 | A | 10/2004 | | |
| JP | 2006341282 | A | 12/2006 | | |
| JP | 2009-299106 | A | 12/2009 | | |
| WO | WO-2005028690 | A1 * | 3/2005 | .......... | B23K 35/304 |
| WO | WO-2022191142 | A1 * | 9/2022 | .......... | B23K 35/304 |

* cited by examiner

COMPOSITE SINTERED BODY, METHOD OF PRODUCING THE SAME, AND JOINING MATERIAL

CROSS-REFERENCE TO RELATED APPLICATIONS

This is a U.S. National Phase Application of PCT/JP2022/009780 filed on Mar. 7, 2022, which designates the United States and claims priority to Japanese Patent Application No. 2021-040241, filed on Mar. 12, 2021, the entire contents of which are incorporated herein by reference.

TECHNICAL FIELD

The present invention relates to a composite sintered body production method, a composite sintered body obtained by the production method, and a joining material used in the production method.

BACKGROUND ART

It is conventional practice to produce a composite sintered body by joining sintered bodies together by brazing or welding. Each of the sintered bodies is obtained, for example, by fabricating an unsintered body containing a metal powder and a binder through metal injection molding and then by debindering and sintering the unsintered body.

However, in the composite sintered body production method as described above, a joining step needs to be performed after fabrication of the sintered bodies. To address this issue, Patent Literature 1 discloses a method in which sintering and joining are simultaneously performed to produce a composite sintered body.

Specifically, in the composite sintered body production method disclosed in Patent Literature 1, a first unsintered body and a second unsintered body are fabricated by metal injection molding and, after that, the first and second unsintered bodies are bonded by a paste composed of a metal powder and an organic binder and then are debindered and sintered.

CITATION LIST

Patent Literature

PTL 1: Japanese Laid-Open Patent Application Publication No. 2004-285466

SUMMARY OF INVENTION

Technical Problem

However, in the composite sintered body production method disclosed in Patent Literature 1, the joining layer in the composite sintered body produced is porous like the sintered bodies located on both sides of the joining layer because of the use of the paste containing a metal powder. In this regard, the joining layer in the composite sintered body is desired to be dense as in the case of conventional brazing.

Patent Literature 1 describes examples where a powder made of stainless steel is used in metal injection molding. However, there is a demand for joining of sintered bodies each of which is made of a Ni-based alloy.

An object of the present invention is therefore to provide: a composite sintered body production method for obtaining a composite sintered body including sintered bodies each of which is made of a Ni-based alloy and which are joined together by a dense joining layer; and a composite sintered body obtained by the production method. Another object of the present invention is to provide a joining material suitable for use in joining of sintered bodies each of which is made of a specific Ni-based alloy.

Solution to Problem

To solve the above problems, a method for producing a composite sintered body according to one aspect of the present invention includes: preparing a first pre-sintered body composed of a powder made of a first Ni-based alloy; preparing a second pre-sintered body composed of a powder made of a second Ni-based alloy: positioning the first and second pre-sintered bodies such that the first and second pre-sintered bodies face each other across a predetermined gap; placing a joining material in a space that adjoins the first and second pre-sintered bodies and to which the gap opens, the joining material being made of a Ni-based alloy having a lower liquidus temperature than the first and second Ni-based alloys; and after the placing of the joining material, heating the first and second pre-sintered bodies to melt the joining material, fill the gap with the molten joining material, and subsequently turn the first and second pre-sintered bodies into first and second sintered bodies, respectively.

The "pre-sintered body" refers to a powder compact that is obtained by heating an unsintered body formed by shaping a powder into a predetermined shape and that has an open porosity of more than 2% to 20% (the unsintered body is a powder compact in which the particles of the powder are bonded together and which has an open porosity of more than 20% or a powder compact in which the spaces between the particles of the powder are filled with a binder). The "sintered body" refers to a powder compact that is obtained by heating the pre-sintered body and that has an open porosity of 2% or less.

The open porosity of a specimen is a value determined by dividing the total volume of open pores (pores inside the specimen that open on the specimen surface (pores inside the specimen that do not open on the specimen surface are closed pores) by the apparent volume of the specimen (volume determined from the dimensions of the specimen). For example, assuming that the density p of a volume surrounded by the surface of the specimen and a continuous surface defined by the open pores is measured, for example, by Archimedes' method, the open porosity $V_{op}$ is calculated by the following equation using the mass m and the apparent volume V of the specimen.

$$V_{op}=((V-m/\rho)N)\times100$$

A composite sintered body production method according to another aspect of the present invention includes: preparing a first pre-sintered body composed of a powder made of a first Ni-based alloy; preparing a second pre-sintered body composed of a powder made of a second Ni-based alloy; positioning the first and second pre-sintered bodies such that the first and second pre-sintered bodies face each other, with a joining material interposed between the first and second pre-sintered bodies, the joining material being made of a Ni-based alloy having a lower liquidus temperature than the first and second Ni-based alloys; and heating the first and second pre-sintered bodies to melt the joining material and subsequently turn the first and second pre-sintered bodies into first and second sintered bodies, respectively.

With the above features, the molten joining material solidifies to form a joining layer between the first and second sintered bodies. Thus, a composite sintered body can be obtained that includes sintered bodies each of which is made of a Ni-based alloy and which are joined together by a dense joining layer.

A composite sintered body obtained by either of the above production methods includes: a first sintered body made of a first Ni-based alloy; a second sintered body made of a second Ni-based alloy; and a joining layer joining the first and second sintered bodies together, the joining layer being made of a Ni-based alloy differing in composition from the first and second Ni-based alloys, wherein the joining layer is denser than the first and second sintered bodies, and the joining layer has a thickness of 200 μm or more.

A joining material of the present invention is made of a Ni-based alloy containing, in percent by mass, 18.0 to 23.0% Cr, 1.5 to 6.5% Mo, 3.5 to 8.5% Si, 13.0% or less Fe, 2.5% or less Nb+Ta, and 1.0% or less Co.

The joining material with the above feature is suitable for use in joining of sintered bodies each of which is made of a Ni-based alloy containing 18.0 to 25.0% Cr, 7.0 to 11.0% Mo, 22.00% or less Fe, 4.5% or less Nb+Ta, and 3.0% or less Co.

Advantageous Effects of Invention

The present invention provides a composite sintered body production method for obtaining a composite sintered body including sintered bodies each of which is made of a Ni-based alloy and which are joined together by a dense joining layer.

DESCRIPTION OF EMBODIMENTS

Figure 1:
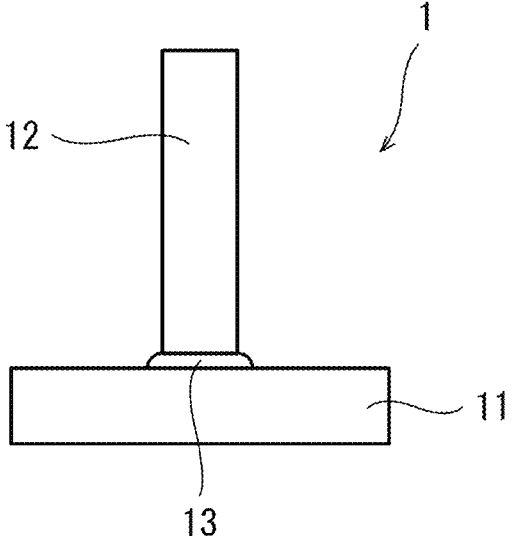
FIG. 1 is a side view of a composite sintered body obtained by a composite sintered body production method according to one embodiment of the present invention.

FIG. 1 shows a composite sintered body 1 obtained by a composite sintered body production method according to one embodiment of the present invention. The composite sintered body 1 includes a first sintered body 11 and a second sintered body 12 that are joined by a joining layer 13.

The first sintered body 11 is made of a first Ni-based alloy, and the second sintered body 12 is made of a second Ni-based alloy. The first and second Ni-based alloys may have the same composition or different compositions. The joining layer 13 is made of a Ni-based alloy differing in composition from the first and second Ni-based alloys.

In FIG. 1, both the first and second sintered bodies 11 and 12 are plate-shaped, and they are orthogonally joined to each other. More specifically, an end surface of the second sintered body 12 is joined to a portion of a major surface of the first sintered body 11 via the joining layer 13.

The shapes and joined portions of the first and second sintered bodies 11 and 12 can be changed as appropriate. For example, the first and second sintered bodies 11 and 12 may be rod-shaped, and the rod-shaped first and second sintered bodies 11 and 12 with their end surfaces butted against each other may be joined by the joining layer 13.

Figure 2A:
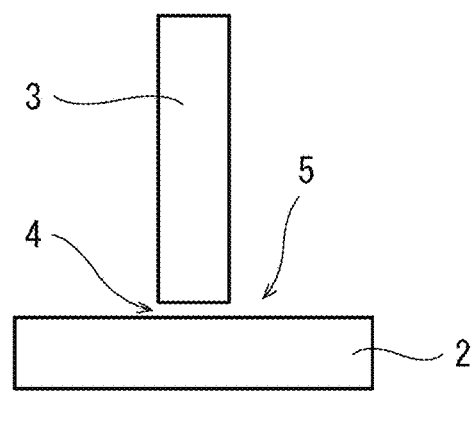
FIGS. 2A to 2C are views for explaining the production method.
Figure 2B:
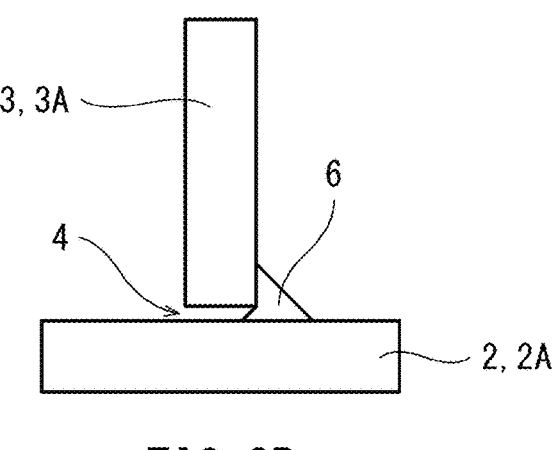

As shown in FIG. 2B, the production method of the present embodiment includes the step of preparing a first pre-sintered body 2A similar in shape to the first sintered body 11 and the step of preparing a second pre-sintered body 3A similar in shape to the second sintered body 12. The first pre-sintered body 2A is composed of a powder made of the first Ni-based alloy, and the second pre-sintered body 3A is composed of a powder made of the second Ni-based alloy.

In the present embodiment, a first unsintered body 2 is fabricated by shaping the powder made of the first Ni-based alloy into a predetermined shape, and the first pre-sintered body 2A is formed during the process of heating the first unsintered body 2 into the first sintered body 11. Likewise, a second unsintered body 3 is fabricated by shaping the powder made of the second Ni-based alloy into a predetermined shape, and the second pre-sintered body 3A is formed during the process of heating the second unsintered body 3 into the second sintered body 12.

Depending on the shape of the first unsintered body 2, a part of the first unsintered body 2 could deform during the process of heating the first unsintered body 2 into the first sintered body 11 due to factors such as gravity, friction caused by shrinkage accompanying the progress of sintering, and restraint between the unsintered bodies, between the pre-sintered bodies, or between the sintered bodies. Likewise, depending on the shape of the second unsintered body 3, a part of the second unsintered body 3 could deform during the process of heating the second unsintered body 3 into the second sintered body 12 due to factors such as gravity, friction caused by shrinkage accompanying the progress of sintering, and restraint between the unsintered bodies, between the pre-sintered bodies, or between the sintered bodies.

Each of the first and second Ni-based alloys contains, in percent by mass (the same applies hereinafter), 18.0 to 25.0% Cr and 7.0 to 11.0% Mo as essential components other than Ni. Each of the first and second Ni-based alloys may contain at least one of 22.0% or less Fe, 4.5% or less Nb+Ta, and 3.0% or less Co as an optional component. The balance of each of the first and second Ni-based alloys, namely the portion other than the components mentioned above, is constituted by Ni and inevitable impurities. As to Nb and Ta, each of the first and second Ni-based alloys may be devoid of either Nb or Ta.

Examples of Ni-based alloys having the composition as described above include Hastelloy X and IN 625 ("IN" is an abbreviation of Inconel™).

Examples of the method for fabricating the first and second unsintered bodies 2 and 3 include, but are not limited to: metal injection molding (MIM); pressing compression molding; and additive manufacturing methods such as, in particular, fused deposition modeling (FDM) and binder jetting. Any of these methods is a process in which a dense metallic part is finally obtained as a result of a sintering step.

In the present embodiment, the first and second unsintered bodies 2 and 3 are fabricated by MIM. Specifically, a powder made of the first or second Ni-based alloy is kneaded uniformly with a binder to form a compound, and this compound is injected into a cavity of a mold. Thus, an unsintered body having the same shape as the cavity of the mold is obtained.

The average particle diameter (median diameter (d50)) of the powder made of the first or second Ni-based alloy is, for example, from 10 to 60 μm. For example, the binder includes, but is not limited to, at least one of polypropylene (PP), polyethylene (PE), polyacetal (POM), polymethyl methacrylate (PMMA), Carnauba wax (CW), paraffin wax (PW), and stearic acid (St).

After the fabrication of the first and second unsintered bodies 2 and 3, as shown in FIG. 2A, a major surface of the first unsintered body 2 and an end surface of the second unsintered body 3 are positioned to face each other across a predetermined gap 4. The size of the gap 4 is, for example, from 1 to 200 μm.

Next, as shown in FIG. 2B, a joining material 6 is placed in a space 5 that adjoins the first and second unsintered bodies 2 and 3 and to which the gap 4 opens (the space 5 in the present embodiment is a corner region defined by the major surface of the first unsintered body 2 and a major surface of the second unsintered body 3).

The joining material 6 is made of a Ni-based alloy having a lower liquidus temperature than the first and second Ni-based alloys. For example, the Ni-based alloy constituting the joining material 6 contains 18.0 to 23.0% Cr, 1.5 to 6.5% Mo, and 3.5 to 8.5% Si as essential components other than Ni, and contains 13.0% or less Fe, 2.5% or less Nb+Ta, and 1.0% or less Co as optional components. The balance of the Ni-based alloy, namely the portion other than the components mentioned above, is constituted by Ni and inevitable impurities.

In the present embodiment, the joining material 6 is a mixture of two types of powders (a first powder and a second powder) differing in composition from each other. The joining material 6 may be a single type of powder with a single composition. The joining material 6 need not be a powder, and may alternatively be in the form of a paste or a film. In the case where the joining material 6 is a mixture of the first and second powders, the liquidus temperature of the joining material 6 refers to a temperature at which all of the powders melt.

The first powder is made of a third Ni-based alloy having a lower liquidus temperature than the first and second Ni-based alloys, and the second powder is made of the first or second Ni-based alloy. For example, the third Ni-based alloy contains, in percent by mass, 16.0 to 22.0% Cr and 8.0 to 12.0% Si. Examples of such a Ni-based alloy include AMS 4782.

Thanks to the Si in the third Ni-based alloy, the liquidus temperature of the joining material 6, which is a mixture of the second powder made of the first or second Ni-based alloy and the first powder made of the third Ni-based alloy, can be made lower than the liquidus temperature of the first or second Ni-based alloy.

For example, the mixing ratio of the first powder to the second powder is from 40%:60% to 80%:20% in percent by mass. For example, assuming that the material of the first powder is AMS 4782 (liquidus temperature: 1135° C.), the material of the second powder is IN 625 (liquidus temperature: 1360° C.), and the mixing ratio of the first powder to the second powder is 60%.40%, then the liquidus temperature of the joining material 6 is 1226° C.

Figure 3:
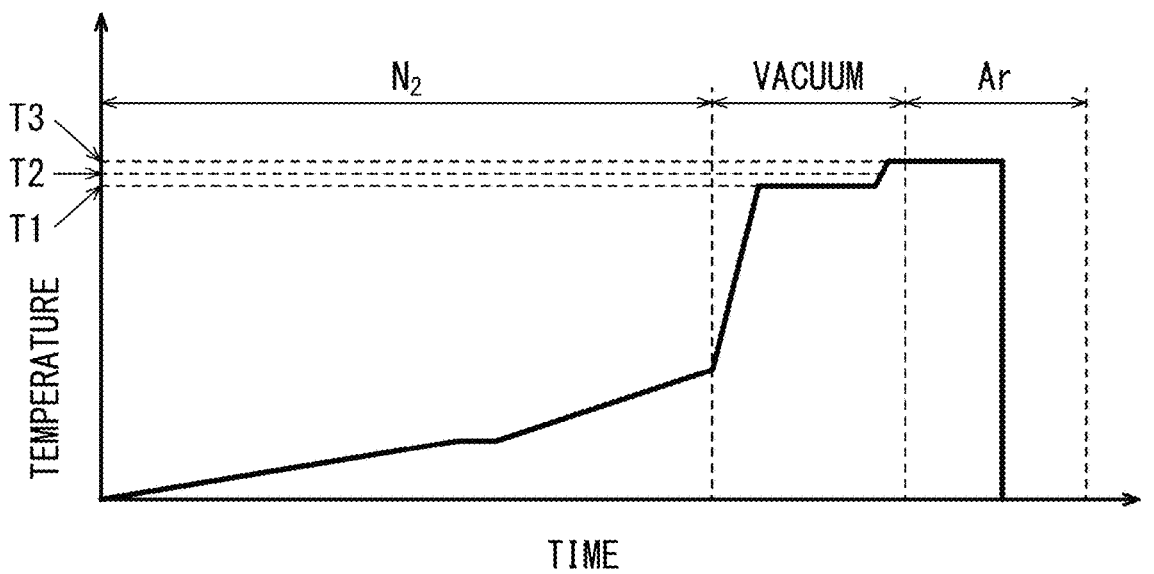
FIG. 3 is a graph showing the relationship between heating time and heating temperature.

After the joining material 6 is placed in the space 5, the first and second unsintered bodies 2 and 3 are heated to a predetermined temperature (for example, 400 to 600° C.) over some length of time as shown in FIG. 3 (for example, 10 to 20 hours), and thus the binder is removed from the first and second unsintered bodies 2 and 3 (debindering).

In the present embodiment, the debindering is performed under nitrogen atmosphere. The debindering may be performed under argon atmosphere. In the present embodiment, the debindering is performed in the same furnace as pre-sintering and main sintering described below.

After the debindering, in a state where the joining material 6 is placed in the space 5, the first and second unsintered bodies 2 and 3 are heated at a pre-sintering temperature T1 lower than a liquidus temperature T2 of the joining material 6 (pre-sintering), and thus the first and second unsintered bodies 2 and 3 are turned into the first and second pre-sintered bodies 2A and 3A, respectively. That is, the pre-sintering results in the first and second pre-sintered bodies 2A and 3A facing each other across the gap 4 and the joining material 6 being placed in the space 5 that adjoins the first and second pre-sintered bodies 2A and 3A and to which the gap 4 opens.

The pre-sintering temperature T1 is desirably lower than a temperature T1a (T1<T1a) that is 50° C. below the liquidus temperature T2 of the joining material 6 (T1a=T2−50). Alternatively, the pre-sintering temperature T1 may be lower than a solidus temperature T2a of the joining material 6 (T1<T2a).

In the present embodiment, the pre-sintering is performed under vacuum. The pre-sintering may be performed under nitrogen or argon atmosphere.

Figure 2C:
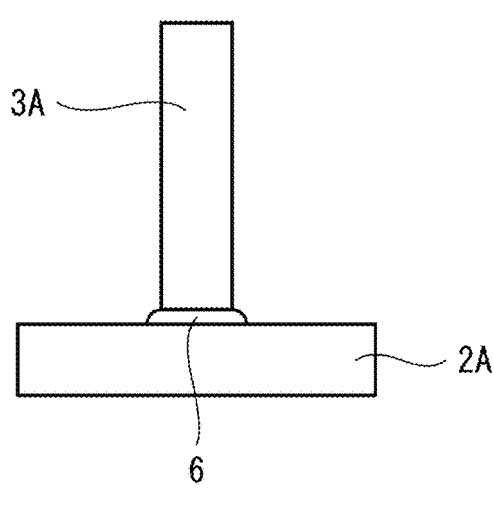

After the pre-sintering, the first and second pre-sintered bodies 2A and 3A are heated at a main sintering temperature T3 higher than the liquidus temperature T2 of the joining material 6 (main sintering). Thus, as shown in FIG. 2C, the joining material 6 is melted to fill the gap 4, and subsequently the first and second pre-sintered bodies 2A and 3A are turned into the first and second sintered bodies 11 and 12, respectively.

The main sintering temperature T3 is a temperature lower than the liquidus temperatures of the first and second Ni-based alloys. The main sintering temperature T3 is desirably higher than a temperature T3a (T3a<T3) that is 15° C. higher than the liquidus temperature T2 of the joining material 6 (T3a=T2+15). In addition, the main sintering temperature T3 is desirably lower than the solidus temperatures of the first and second Ni-based alloys.

In the present embodiment, the early stage of the main sintering (at least the period until the joining material 6 melts to fill the gap 4) is performed under vacuum, and the later stage of the main sintering is performed under argon atmosphere. The whole main sintering may be performed under vacuum or argon atmosphere.

In the case where the first and second Ni-based alloys are Hastelloy X, the main sintering performed under vacuum is likely to cause evaporation of the Ni-based alloys even if the main sintering temperature T3 is lower than the solidus temperature of Hastelloy X. In contrast, the main sintering performed under argon atmosphere allows for reduced evaporation of the Ni-based alloys.

After the main sintering, the first and second sintered bodies 11 and 12 are cooled. Thus, the composite sintered body 1 can be obtained which, as shown in FIG. 1, includes the first and second sintered bodies 11 and 12 joined together by the joining layer 13. After the production of the composite sintered body 1, the composite sintered body 1 may be subjected to HIP treatment and solution treatment at a temperature lower than the liquidus temperature T2 or solidus temperature T2a of the joining material 6.

The joining layer 13 is formed as a result of solidification of the joining material 6. The solidification of the joining material 6 takes place as a result of diffusion of a particular component of the molten joining material 6 into the first and second sintered bodies 11 and 12 or as a result of cooling of the first and second sintered bodies 11 and 12.

Figure 4:
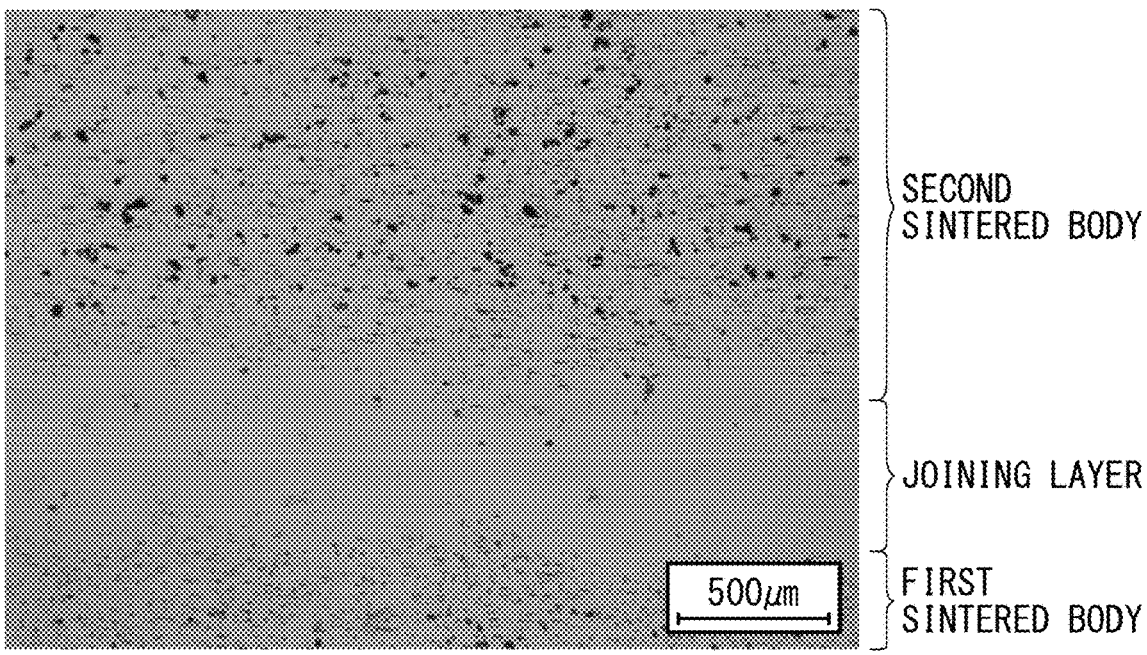
FIG. 4 is a microscope image of a cross-section of a composite sintered body.

FIG. 4 shows a cross-section of the composite sintered body 1 obtained by the production method of the present embodiment. The joining layer 13 is denser than the first and second sintered bodies 11 and 12 and has a thickness of 200 μm or more (such a thickness is achieved due to melting of the joining material 6 and diffusion of a component of the joining material 6 even if the size of the gap 4 between the first and second unsintered bodies 2 and 3 in the production process is 1 μm).

The thickness of the joining layer 13 is a region that shows a high concentration of a component (e.g., Si) contained only in the joining layer 13 when a cross-section of the composite sintered body 1 is subjected to component analysis in a direction perpendicular to the joining layer 13.

As described above, in the composite sintered body production method of the present embodiment, the molten joining material 6 solidifies to form the joining layer 13 between the first and second sintered bodies 11 and 12. Thus, the composite sintered body 1 can be obtained which includes the sintered bodies 11 and 12 each of which is made of a Ni-based alloy and which are joined together by the dense joining layer 13.

Additionally, in the present embodiment, the composition of the joining layer 13 can be made close to the composition of the first or second sintered body 11 or 12 since the joining material 6 is a mixture of the second powder made of the first or second Ni-based alloy and the first powder made of the third Ni-based alloy.

MODIFICATIONS

The present invention is not limited to the embodiment described above, and various modifications can be made without departing from the gist of the present invention.

For example, in the above embodiment, the first and second unsintered bodies 2 and 3 are heated into the first and second pre-sintered bodies 2A and 3A after the joining material 6 has been placed in the space 5 adjoining the first and second unsintered bodies 2 and 3. Alternatively, the first unsintered body 2 may be heated alone into the first pre-sintered body 2A after fabrication of the first unsintered body 2, the second unsintered body 3 may be heated alone into the second pre-sintered body 3A after fabrication of the second unsintered body 3, and then the first and second pre-sintered bodies 2A and 3A may be heated with the joining material 6 placed in the space 5 adjoining the first and second pre-sintered bodies 2A and 3A. However, with the method of the above embodiment, the first and second pre-sintered bodies 2A and 3A can be simultaneously prepared, and the pre-sintering, the melting of the joining material, and the main sintering can be performed in succession.

In the above embodiment, the first and second unsintered bodies 2 and 3 are positioned to face each other across the gap 4, and the joining material 6 is placed in the space 5 that adjoins the first and second unsintered bodies 2 and 3 and to which the gap 4 opens. Alternatively, the first and second unsintered bodies 2 and 3 may be positioned to face each other with the joining material 6 interposed between them, and in this state the first and second unsintered bodies 2 and 3 may be heated.

The first and second unsintered bodies 2 and 3 turn into the first and second pre-sintered bodies 2A and 3A, respectively, by being heated, and this results in the first and second pre-sintered bodies 2A and 3A facing each other with the joining material 6 interposed between them. After that, the first and second pre-sintered bodies 2A and 3A are heated, with the consequence that the joining material 6 melts and subsequently the first and second pre-sintered bodies 2A and 3A turn into the first and second sintered bodies 11 and 12, respectively.

Alternatively, the first unsintered body 2 may be heated alone into the first pre-sintered body 2A after fabrication of the first unsintered body 2, the second unsintered body 3 may be heated alone into the second pre-sintered body 3A after fabrication of the second unsintered body 3, then the first and second pre-sintered bodies 2A and 3A may be positioned to face each other with the joining material 6 interposed between them, and in this state the first and second pre-sintered bodies 2A and 3A may be heated.

SUMMARY

A method for producing a composite sintered body according to one aspect of the present invention includes: preparing a first pre-sintered body composed of a powder made of a first Ni-based alloy; preparing a second pre-sintered body composed of a powder made of a second Ni-based alloy; positioning the first and second pre-sintered bodies such that the first and second pre-sintered bodies face each other across a predetermined gap; placing a joining material in a space that adjoins the first and second pre-sintered bodies and to which the gap opens, the joining material being made of a Ni-based alloy having a lower liquidus temperature than the first and second Ni-based alloys; and after the placing of the joining material, heating the first and second pre-sintered bodies to melt the joining material, fill the gap with the molten joining material, and subsequently turn the first and second pre-sintered bodies into first and second sintered bodies, respectively.

With the above features, the molten joining material solidifies to form a joining layer between the first and second sintered bodies. Thus, a composite sintered body can be obtained that includes sintered bodies each of which is made of a Ni-based alloy and which are joined together by a dense joining layer.

A first unsintered body may be fabricated by shaping the powder made of the first Ni-based alloy into a predetermined shape, a second unsintered body may be fabricated by shaping the powder made of the second Ni-based alloy into a predetermined shape, the first and second unsintered bodies may be positioned to face each other across the gap, the joining material may be placed in a space that adjoins the first and second unsintered bodies and to which the gap opens, and in a state where the joining material is placed in the space, the first and second unsintered bodies may be heated at a temperature lower than the liquidus temperature of the joining material to turn the first and second unsintered bodies into the first and second pre-sintered bodies, respectively. With these features, the first and second pre-sintered bodies can be simultaneously prepared, and the pre-sintering, the melting of the joining material, and the main sintering can be performed in succession.

A composite sintered body production method according to another aspect of the present invention includes: preparing a first pre-sintered body composed of a powder made of a first Ni-based alloy; preparing a second pre-sintered body composed of a powder made of a second Ni-based alloy; positioning the first and second pre-sintered bodies such that the first and second pre-sintered bodies face each other, with a joining material interposed between the first and second pre-sintered bodies, the joining material being made of a Ni-based alloy having a lower liquidus temperature than the first and second Ni-based alloys; and heating the first and second pre-sintered bodies to melt the joining material and subsequently turn the first and second pre-sintered bodies into first and second sintered bodies, respectively.

With the above features, the molten joining material solidifies to form a joining layer between the first and second sintered bodies. Thus, a composite sintered body can be obtained that includes sintered bodies each of which is made of a Ni-based alloy and which are joined together by a dense joining layer.

In the composite sintered body production method according to the other aspect, a first unsintered body may be fabricated by shaping the powder made of the first Ni-based alloy into a predetermined shape, a second unsintered body may be fabricated by shaping the powder made of the second Ni-based alloy into a predetermined shape, the first and second unsintered bodies may be positioned to face each other, with the joining material interposed between the first and second unsintered bodies, and in a state where the joining material is interposed between the first and second unsintered bodies, the first and second unsintered bodies may be heated at a temperature lower than the liquidus temperature of the joining material to turn the first and second unsintered bodies into the first and second pre-sintered bodies, respectively. With these features, the first and second pre-sintered bodies can be simultaneously prepared, and the pre-sintering step and the main sintering step can be performed in succession.

For example, the first and second unsintered bodies may be fabricated by metal injection molding.

For example, the first and second Ni-based alloys may have the same composition.

For example, each of the first and second Ni-based alloys may contain, in percent by mass, 18.0 to 25.0% Cr, 7.0 to 11.0% Mo, 22.0% or less Fe, 4.5% or less Nb+Ta, and 3.0% or less Co.

For example, the Ni-based alloy constituting the joining material may contain, in percent by mass, 18.0 to 23.0% Cr, 1.5 to 6.5% Mo, 3.5 to 8.5% Si, 13.0% or less Fe, 2.5% or less Nb+Ta, and 1.0% or less Co.

The joining material may be a mixture of a first powder made of a third Ni-based alloy having a lower liquidus temperature than the first and second Ni-based alloys and a second powder made of the first or second Ni-based alloy. With this feature, the composition of the joining layer can be made close to the composition of the first or second sintered body.

For example, the mixing ratio of the first powder to the second powder may be from 40%:60% to 80%:20% in percent by mass.

The third Ni-based alloy may contain, in percent by mass, 16.0 to 22.0% Cr and 8.0 to 12.0% Si. With this feature, thanks to the Si in the third Ni-based alloy, the liquidus temperature of the joining material, which is a mixture of the second powder made of the first or second Ni-based alloy and the first powder made of the third Ni-based alloy, can be made lower than the liquidus temperature of the first or second Ni-based alloy.

A composite sintered body obtained by either of the above production methods includes: a first sintered body made of a first Ni-based alloy; a second sintered body made of a second Ni-based alloy; and a joining layer joining the first and second sintered bodies together, the joining layer being made of a Ni-based alloy differing in composition from the first and second Ni-based alloys, wherein the joining layer is denser than the first and second sintered bodies, and the joining layer has a thickness of 200 µm or more.

A joining material of the present invention is made of a Ni-based alloy containing, in percent by mass, 18.0 to 23.0% Cr, 1.5 to 6.5% Mo, 3.5 to 8.5% Si, 13.0% or less Fe, 2.5% or less Nb+Ta, and 1.0% or less Co.

The joining material with the above feature is suitable for use in joining of sintered bodies each of which is made of a Ni-based alloy containing 18.0 to 25.0% Cr, 7.0 to 11.0% Mo, 22.0% or less Fe, 4.5% or less Nb+Ta, and 3.0% or less Co.

REFERENCE SIGNS LIST 1 composite sintered body
11 first sintered body
12 second sintered body
13 joining layer
2 first unsintered body
2A first pre-sintered body
3 second unsintered body
3A second pre-sintered body
4 gap
5 space

The invention claimed is:

1. A method for producing a composite sintered body, comprising:
    preparing a first pre-sintered body composed of a powder made of a first Ni-based alloy;
    preparing a second pre-sintered body composed of a powder made of a second Ni-based alloy;
    positioning the first and second pre-sintered bodies such that the first and second pre-sintered bodies face each other across a predetermined gap;
    placing a joining material in a space that adjoins the first and second pre-sintered bodies and to which the gap opens, the joining material being made of a Ni-based alloy having a lower liquidus temperature than the first and second Ni-based alloys; and
    after the placing of the joining material, heating the first and second pre-sintered bodies to melt the joining material, fill the gap with the molten joining material, and subsequently turn the first and second pre-sintered bodies into first and second sintered bodies, respectively.

2. The method according to claim 1, wherein
    a first unsintered body is fabricated by shaping the powder made of the first Ni-based alloy into a predetermined shape,
    a second unsintered body is fabricated by shaping the powder made of the second Ni-based alloy into a predetermined shape,
    the first and second unsintered bodies are positioned to face each other across the gap,
    the joining material is placed in a space that adjoins the first and second unsintered bodies and to which the gap opens, and
    in a state where the joining material is placed in the space, the first and second unsintered bodies are heated at a temperature lower than the liquidus temperature of the joining material to turn the first and second unsintered bodies into the first and second pre-sintered bodies, respectively.

3. A method for producing a composite sintered body, comprising:
    preparing a first pre-sintered body composed of a powder made of a first Ni-based alloy;
    preparing a second pre-sintered body composed of a powder made of a second Ni-based alloy;
    positioning the first and second pre-sintered bodies such that the first and second pre-sintered bodies face each other, with a joining material interposed between the first and second pre-sintered bodies, the joining material being made of a Ni-based alloy having a lower liquidus temperature than the first and second Ni-based alloys; and heating the first and second pre-sintered bodies to melt the joining material and subsequently turn the first and second pre-sintered bodies into first and second sintered bodies, respectively.

4. The method according to claim 3, wherein a first unsintered body is fabricated by shaping the powder made of the first Ni-based alloy into a predetermined shape, a second unsintered body is fabricated by shaping the powder made of the second Ni-based alloy into a predetermined shape, the first and second unsintered bodies are positioned to face each other, with the joining material interposed between the first and second unsintered bodies, and in a state where the joining material is interposed between the first and second unsintered bodies, the first and second unsintered bodies are heated at a temperature lower than the liquidus temperature of the joining material to turn the first and second unsintered bodies into the first and second pre-sintered bodies, respectively.

5. The method according to claim 2, wherein the first and second unsintered bodies are fabricated by metal injection molding.

6. The method according to claim 1, wherein the first and second Ni-based alloys have the same composition.

7. The method according to claim 1, wherein each of the first and second Ni-based alloys contains, in percent by mass, 18.0 to 25.0% Cr, 7.0 to 11.0% Mo, 22.0% or less Fe, 4.5% or less Nb+Ta, and 3.0% or less Co.

8. The method according to claim 1, wherein the Ni-based alloy constituting the joining material contains, in percent by mass, 18.0 to 23.0% Cr, 1.5 to 6.5% Mo, 3.5 to 8.5% Si, 13.0% or less Fe, 2.5% or less Nb+Ta, and 1.0% or less Co.

9. The method according to claim 1, wherein the joining material is a mixture of a first powder made of a third Ni-based alloy having a lower liquidus temperature than the first and second Ni-based alloys and a second powder made of the first or second Ni-based alloy.

10. The method according to claim 9, wherein a mixing ratio of the first powder to the second powder is from 40%:60% to 80%:20% in percent by mass.

11. The method according to claim 9, wherein the third Ni-based alloy contains, in percent by mass, 16.0 to 22.0% Cr and 8.0 to 12.0% Si.

* * * * *